D. BICKFORD.
Apparatus for Carbureting Air.
No. 6,431. Reissued May 18, 1875.
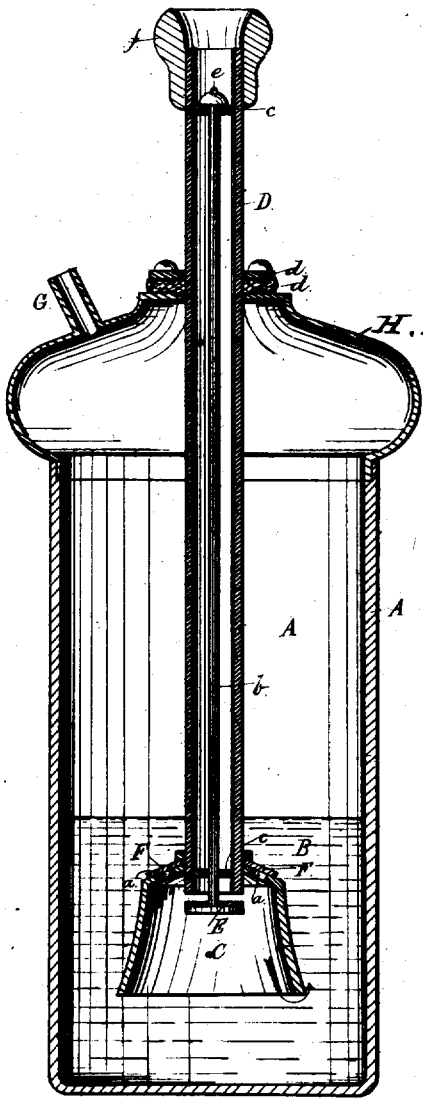
Witnesses:
George T. Smallwood Jr.
John Robey Jr.
Inventor:
Dana Bickford
By John J. Halsted,
Atty.
THE GRAPHIC CO. PHOTO-LITH. 39 & 41 PARK PLACE, N.Y.

UNITED STATES PATENT OFFICE

DANA BICKFORD, OF NEW YORK, N. Y.

IMPROVEMENT IN APPARATUS FOR CARBURETING AIR.

Specification forming part of Letters Patent No. 51,128, dated November 28, 1865; reissue No. 6,431, dated May 18, 1875; application filed April 23, 1875.

*To all whom it may concern:*

Be it known that I, DANA BICKFORD, formerly of Boston, in the county of Suffolk and State of Massachusetts, but now of the city, county, and State of New York, have invented a new and useful Apparatus for Carbureting Aeriform Bodies, and which is also applicable for use as an air-forcing pump; and I do hereby declare the same to be fully described in the following specification and represented in the accompanying drawing, which denotes a vertical section of an apparatus illustrating my invention.

In my construction I employ a closed vessel for containing the hydrocarbon or other liquid; an adjustable inlet-tube, capable of being adjusted to the varying height of the liquid in such vessel; a bell or inverted cup attached to a stem or tube, and also adjustable relatively to the quantity of liquid in the vessel; a stuffing or packing box, through which the inlet-tube may be moved vertically; and a valve or valves when the apparatus is used as a pump or air-condenser, and other features hereinafter named.

In the said drawing, A denotes a closed vessel, containing a mass of oil, a hydrocarbon, or other liquid, B, as the case may be, and filled to the desired height. Within this vessel A there is a bell or cup, C, which opens downward, and has a flaring mouth, and is affixed to a tube or stem, D, which extends out of the upper end of the vessel A, and through a stuffing-box, *d d*, applied to such vessel. The lower end of the stem or tube D projects somewhat into the bell C, and is provided with a valve, E, whose stem *b* extends upward within the tube, and is supported within it by two bars, *c c*, carried across and fixed to the bore of the tube. This stem *b* is arranged to slide freely through these bars, and it has a head, *e*, on its upper end, such head being for the purpose of supporting the rod of the valve by the upper cross-bar *c* when the valve is off the lower end of the tube. Through the upper part of the bell C are one or more holes, *a a*, provided with a valve, F, arranged on the bell, and applied thereto so as to be capable of opening upward. A conduit, G, leads out of the upper part H of the vessel A.

By taking hold of the knob or head *f*, formed on the upper part of the tube D, and quickly moving the tube and bell up and down within the vessel A, so as to move the bell into and out of the liquid, air will be drawn through the tube and into the bell, and be expelled through the openings *a a*, and be condensed in the space above the liquid, whence it may be drawn by the conduit G, which may lead to any place or article where it may be desirable for such condensed air to be employed.

By using for the liquid in the vessel A a liquid hydrocarbon, such as gasoline, the apparatus may be used for carbureting the air or gaseous matter which may be forced through such liquid. In such case the valves would not be needed.

It will be seen from the above construction that any desired liquid may be used in the vessel, depending upon the use to which the apparatus is to be put; that the vessel may be of any size required; that the height of the liquid in the vessel may be varied at option; and that the tube and the bell may also be adjusted to any height or depth required relatively to the liquid; and that the bell may be entirely or partially immersed therein; that when air or gas having a force or pressure of its own is admitted into the tube D there will be no need of moving the tube up or down for the purpose of forcing it in; that the valve E serves to admit it in either case; that the stuffing or packing box makes a tight joint for the adjustable tube, at the same time serving to prevent the escape of the aeriform matter contained in the upper part of the vessel; and that the apparatus, when hydrocarbons or similar material is used therein, may be located outside of and away from the building, so as to remove to a distance all offensiveness of odor or risk from accidents, the conduit G, as above stated, leading to any desired place.

I claim—

1. In a carbureter, an inlet-tube made adjustable vertically to adapt the same to the quantity of liquid in the vessel.

2. In a carbureter, the combination, with an inlet-tube, of an inverted cup having a flaring or bell-shaped mouth, the tube entering the top of the bell, whereby the air or gas flows downward through the tube and into the bell, and is thence distributed.

3. A carbureter provided with a bell or inverted cup for receiving the gaseous matter, made adjustable relatively to the quantity of liquid in the vessel.

4. A closed vessel for containing liquid hydrocarbon or its equivalent, in combination with an inlet-tube for conducting into it gaseous bodies to be carbureted therein, and with an inverted cup, bell, or cone appended to and in direct communication with such tube.

5. The described apparatus, as composed of the vessel A, provided with a cover, H, and a stuffing-box, *d*, the bell-shaped vessel or cup C, its tube D, and valves E and F, substantially as and for the purpose set forth.

DANA BICKFORD.

Witnesses:

WILLIAM FITCH,

GEO. T. SMALLWOOD, Jr.